(12) United States Patent
Matsuo et al.

(10) Patent No.: US 7,703,831 B2
(45) Date of Patent: Apr. 27, 2010

(54) WINDSHIELD UNIT FOR SADDLE-RIDE TYPE VEHICLE

(75) Inventors: Hisashi Matsuo, Saitama (JP); Yasushi Takahashi, Saitama (JP); Yoshihiro Namiki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/252,602

(22) Filed: Oct. 16, 2008

(65) Prior Publication Data

US 2009/0108621 A1 Apr. 30, 2009

(30) Foreign Application Priority Data

Oct. 31, 2007 (JP) ............................. 2007-283856

(51) Int. Cl.
*B60J 9/04* (2006.01)
(52) U.S. Cl. ........................................ 296/91; 296/78.1
(58) Field of Classification Search .................. 296/91, 296/180.1, 78.1, 77.1, 208, 84.1; 180/219, 180/229, 68.1; 165/202, 203, 204, 42, 43
See application file for complete search history.

(56) References Cited

U.S. PATENT DOCUMENTS

| 4,911,494 A * | 3/1990 | Imai et al. ..................... 296/91 |
|---|---|---|
| 6,588,529 B2 * | 7/2003 | Ishii et al. .................... 180/219 |
| 7,261,358 B2 * | 8/2007 | Kurakawa et al. .......... 296/78.1 |
| 7,510,229 B2 * | 3/2009 | Katagiri et al. ............. 296/78.1 |
| 2007/0004329 A1 * | 1/2007 | Miyakawa et al. .......... 454/299 |
| 2007/0066210 A1 * | 3/2007 | Ueda et al. .................. 454/125 |
| 2008/0079285 A1 * | 4/2008 | Ueda et al. ................ 296/180.1 |
| 2008/0185865 A1 * | 8/2008 | Matsuo et al. ............. 296/78.1 |
| 2009/0108620 A1 * | 4/2009 | Matsuo et al. ................ 296/91 |
| 2009/0108621 A1 * | 4/2009 | Matsuo et al. ................ 296/91 |

FOREIGN PATENT DOCUMENTS

| EP | 1 759 969 A1 | 3/2007 |
|---|---|---|
| JP | 2007-62616 A | 3/2007 |

* cited by examiner

*Primary Examiner*—Kiran B. Patel
(74) *Attorney, Agent, or Firm*—Birch, Stewart, Kolasch & Birch LLP

(57) ABSTRACT

A pressure difference rearward of a windshield is efficiently corrected in a windshield unit for a saddle-ride type vehicle provided with two types of air ducts for directing the air flow from the front of the vehicle to the upside of the vehicle and to the rear of the windshield. A windshield unit includes an air duct for allowing an air introduction port opening toward the front of the vehicle to communicate with an air blowout port opening toward the upside of the vehicle and a second air duct for allowing a second air introduction port opening toward the front of the vehicle to communicate with a second air blowout port disposed rearward of the air duct to open toward the rear of the vehicle. The second air blowout port is disposed within the left-right width of the air blowout port of the air duct.

8 Claims, 8 Drawing Sheets

WINDSHIELD UNIT FOR SADDLE-RIDE TYPE VEHICLE

CROSS-REFERENCE TO RELATED APPLICATIONS

The present application claims priority under 35 USC 119 to Japanese Patent Application No. 2007-283856 filed on Oct. 31, 2007 the entire contents of which are hereby incorporated by reference.

BACKGROUND OF THE INVENTION

1. Field of the Invention

The present invention relates to a windshield unit for a saddle-ride type vehicle.

2. Description of Background Art

Conventionally, a windshield for a saddle-ride type vehicle is known that includes a first air duct adapted to allow a first air introduction port opening toward the front of the vehicle to communicate with a first air blowout port opening toward the upside of the vehicle and a second air duct adapted to allow a second air introduction port opening toward the front of the vehicle to communicate with a second air blowout port opening toward the inside of a windshield. See, for example, Japanese Patent Laid-Open No. 2007-062616.

This is effective because of the following. The air flow from the front of the vehicle is led to the upside through the first air duct to suppress the height of the windshield and further to enhance the windshield effect, as compared with that of the general windshield unit not having the air duct. In addition, the occurrence of a negative pressure inside the windshield due to an enhanced windshield effect is suppressed by the air flow directed through the second air duct to correct the pressure difference rearward of the windshield.

However, in the conventional technology, the second air blowout ports are located on the left and right outsides of the windshield. More specifically, on the outside of the left-right width of the first air blowout port. In this case, the air flow blowing out from the second air blowout ports may be caught in the air flow flowing on the left and right outsides of the windshield. Thus, the pressure difference rearward of the windshield may not be sufficiently corrected in some cases.

SUMMARY AND OBJECTS OF THE INVENTION

Accordingly, it is an object of an embodiment of the present invention to efficiently correct a pressure difference rearward of a windshield in a windshield unit for a saddle-ride type vehicle provided with two types of air ducts adapted to direct an air flow from the front of the vehicle to the upside of the vehicle and to the rearward of the windshield.

According to an embodiment of the present invention, a windshield unit is provided for a saddle-ride type vehicle, for example, a motorcycle 1 including a first air duct 31 adapted to allow a first air introduction port 32 that is opened towards the front of the vehicle to communicate with a first air blowout port 33 opening toward the upside of the vehicle. A second air duct 51 is adapted to allow a second air introduction port 52 opening toward the front of the vehicle to communicate with a second air blowout port 53, 53' disposed rearward of the air duct to open toward the rear of the vehicle; the second air blowout port is disposed within a left-right width of the first air blowout port.

According to an embodiment of the present invention, an instrument panel 23 is disposed rearward of the first air duct to indicate vehicle speed. A meter cover 23a is provided for covering the instrument cover. In addition, the second air blowout port is disposed on the periphery of the meter cover.

According to an embodiment of the present invention, the second air blowout port is disposed above the meter cover.

According to an embodiment of the present invention, a pair of the left and right second air ducts are provided with the respective second air introduction ports of the left and right second air ducts being respectively provided adjacently to the left and right outsides of the first air introduction ports, and the left and right second air ducts are each provided close to the second air blowout port to be displaced on the left-right inside of the first air duct.

According to an embodiment of the present invention, an opening area of the second air blowout port is set to a value greater than that of the second air introduction port.

According to an embodiment of the present invention, since the air flow from the front of the vehicle through the first air duct is led to the upside, the height of the windshield is suppressed and further the windshield effect can be enhanced, as compared with a general windshield unit not having the air duct.

In addition, the second air duct adapted to regulate the pressure rearward of the windshield and the air flow led through the second air duct is blown out from the second air blowout port located within the left-right width (close to the left-right center of the vehicle body) of the first air blowout port. Therefore, the enhanced windshield effect effectively reduces the negative pressure rearward of the windshield that is likely to occur particularly close to the left-right center of the vehicle body. Consequently, the pressure difference rearward of the windshield can be corrected uniformly and efficiently.

According to an embodiment of the present invention, since the second air blowout port is disposed at a position close to the open space forward of the occupant, the negative pressure state rearward of the windshield can more effectively be alleviated.

According to an embodiment of the present invention, since the second air blowout port is located closer to the open space, the negative pressure state rearward of the windshield can more effectively be alleviated.

According to an embodiment of the present invention, an increase in the thickness of the windshield on the periphery of each air introduction port and the second air duct can be disposed close to the periphery of the first air duct.

According to an embodiment of the present invention, the air flow taken in from the second air introduction port can be blown out from the second air blowout port while being appropriately diffused. Therefore, the air flow directly striking the occupant rearward of the windshield is alleviated and further the pressure difference rearward of the windshield can be corrected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
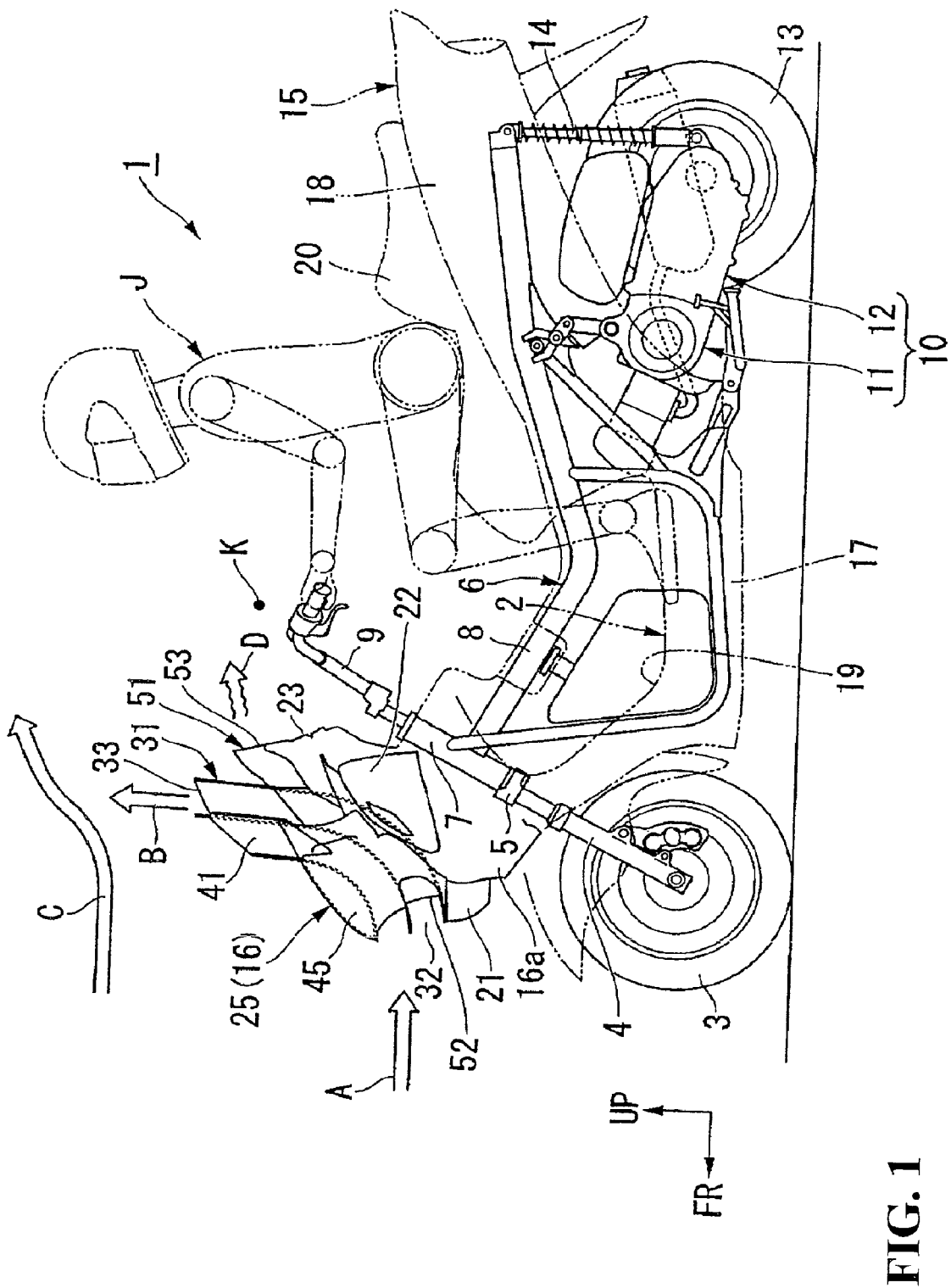
FIG. 1 is a left lateral view of a motorcycle according to an embodiment of the present invention.

Embodiments of the present invention will hereinafter be described with reference to the drawings. It is to be noted that the orientations such as the front, back or rear, left, right, etc. in the following description are the same as that of a vehicle unless otherwise explained. In addition, arrows FR, LH and UP in the drawings denote the front, left and upside, respectively, of the vehicle.

A motorcycle (a saddle-ride type vehicle) 1 illustrated in FIG. 1 is for example a scooter type vehicle having a low-floor 2. A front wheel 3 of the motorcycle 1 is rotatably supported by a telescopic front fork 4. The front fork 4 is steerably supported by a head pipe 7 located at a front end of a body frame 6 via a steering stem 5. The body frame 6 includes a main pipe 8 extending rearwardly and downward from the head pipe 7, then bending, and further extending rearwardly and upward. Steering handlebars 9 are attached to the upper end of the steering stem 5.

A swing unit 10 is supported by the rear portion of the body frame 6 so as to be swingable around its front end. The swing unit 10 is integrally composed of an engine 11 and a power transmission mechanism 12. A rear wheel 13 which is a drive wheel is attached to an output shaft located at the rear end of the swing unit. A shock absorber 14 is disposed between the rear end of the swing unit 10 and the rear end of the body frame 6.

The body frame 6 is covered by a body cover 15 made mainly of a synthetic resin. The body cover 15 mainly includes a front cover (front cowl) 16; an under cover 17; a rear cover 18; and a floor cover 19. The front cover 16 covers the front portion of the body frame 6 so as to extend from the front thereof to the left and right sides thereof. The under cover 17 is continued from the lower portion of the front cover 16 to cover the lower portion of the body frame 6. The rear cover 18 covers the rear portion of the body frame 6. The floor cover 19 covers a portion extends from the rear portion of the front cover 16 to the upper portion of the under cover 17.

A seat 20 for occupants (driver and pillion) is disposed above the rear cover 18 so as to be able to open and close an article storage chamber (not shown) in the rear cover 18. An occupant (the driver) J sitting on the front portion of the seat 20 puts her or his hands on the left and right grips of the handlebars 9 and assumes such a driving posture as to put her or his feet on the left and right upper surfaces of the floor cover 19. A front cover 16 is located in front of (forward of) the occupant J located at such a riding position to reduce a air flow pressure against the occupant J.

Figure 2:
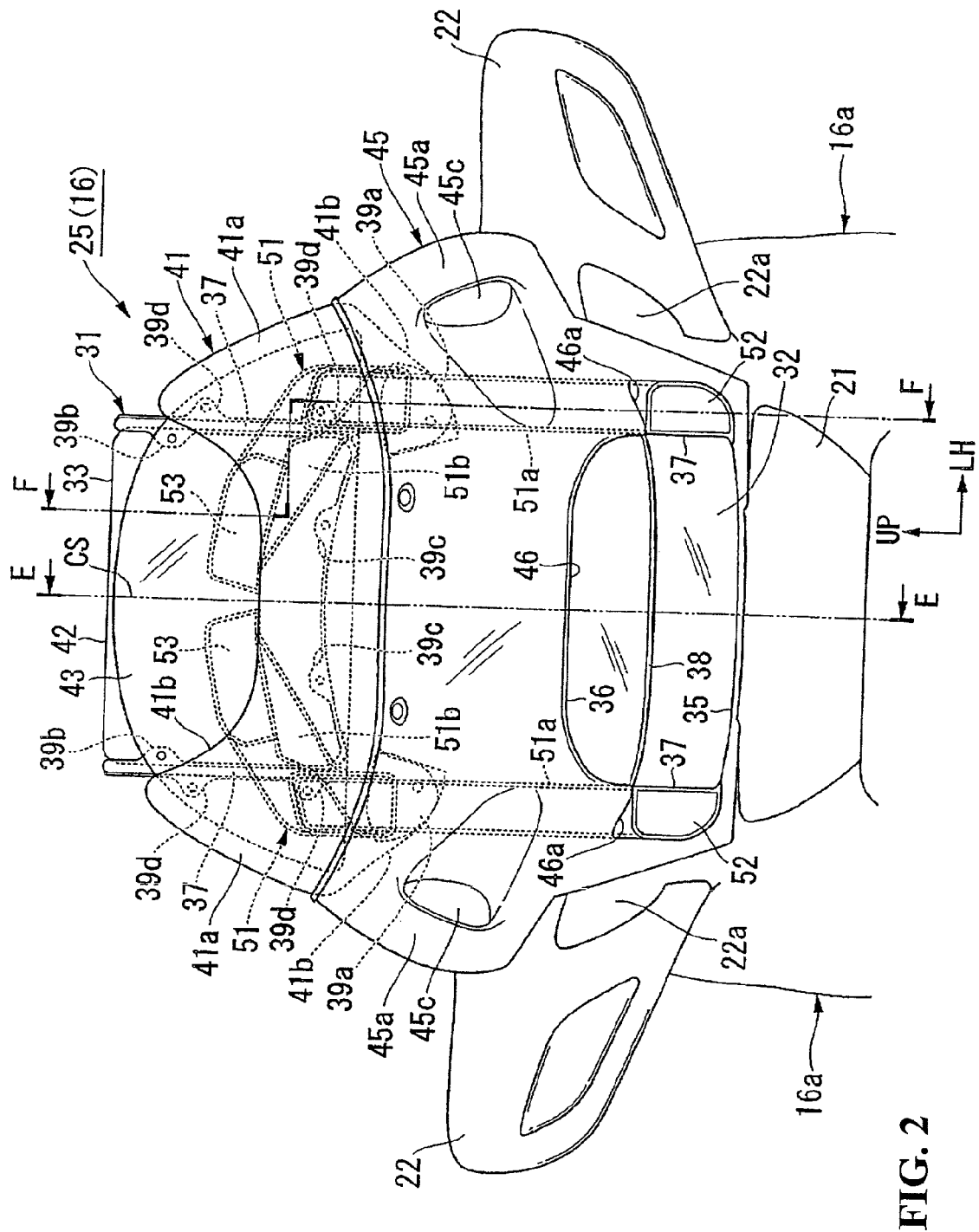
FIG. 2 is a front view of a front cover of the motorcycle.

Referring to FIG. 2, the upper portion of the front cover 16 is constructed as a screen 25 made of a transparent or semi-transparent transmissive resin such as polycarbonate. Although the occupant J can visibly recognize the front of the vehicle through the screen 25, the upper edge of the screen 25 (the front cover 6) is set to such a height so as not to shield the front view of the occupant J (to such a height as to correspond to a breast). An opening space K for a riding operation is defined between the occupant J located at the riding position and the screen 25. In addition, a portion (a cover body 16a) of the front cover 16 excluding the screen 25 is made of a nontransparent resin such as ABS. In FIG. 2, a headlight 21 is disposed at the front end of the front cover 16 and rearview mirrors 22 are disposed on both the left and right sides of the front cover 16.

Figure 6:
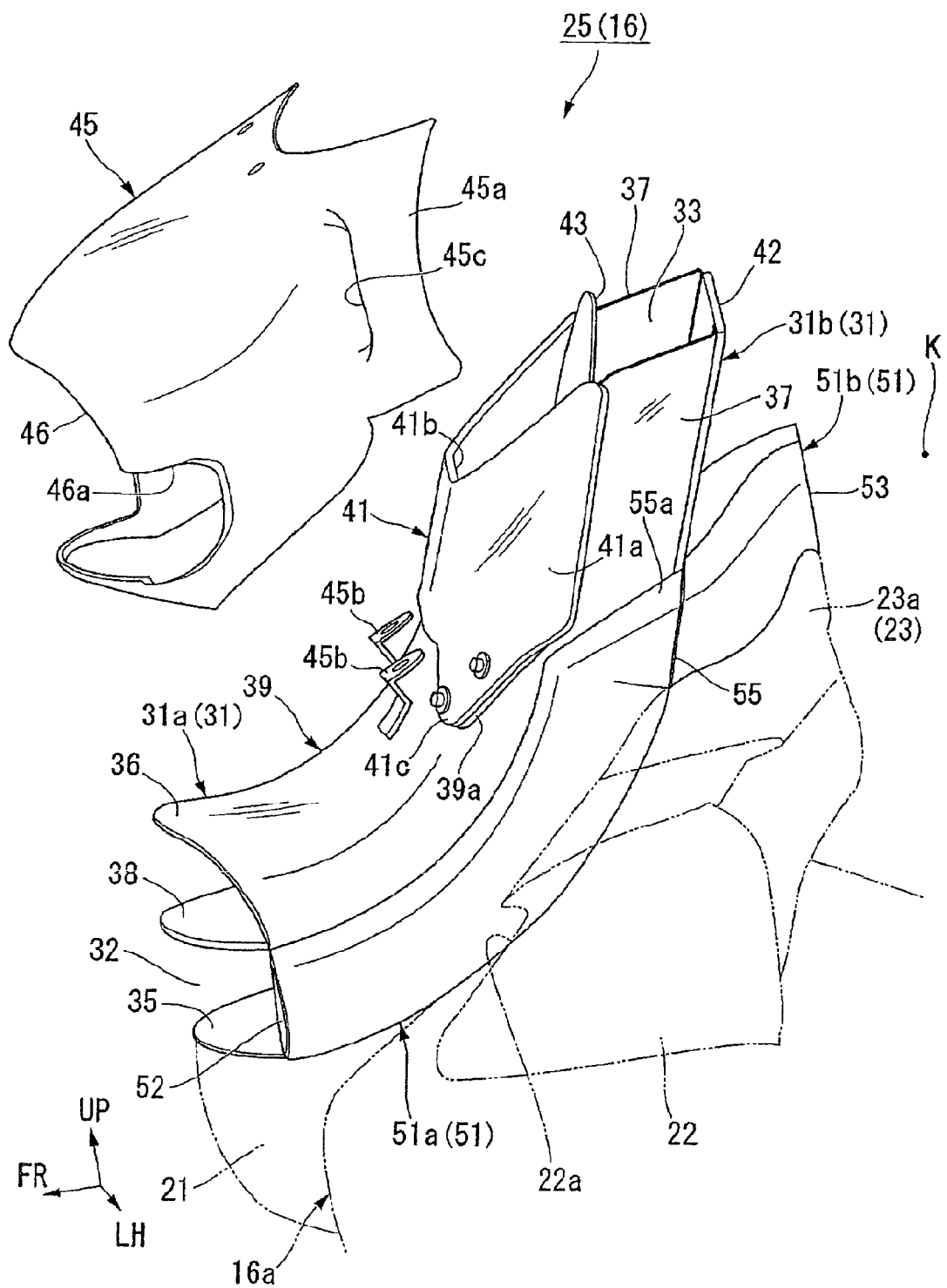
FIG. 6 is an exploded perspective view of the front cover.

With reference to FIGS. 2 and 6, the screen 25 includes an air duct 31 slant rearwardly and upward to guide air flow from the front of the vehicle to the upside, a lower cowl 45 covering the lower front side of the air duct 31, and a pair of left and right second air ducts 51.

Figure 3:
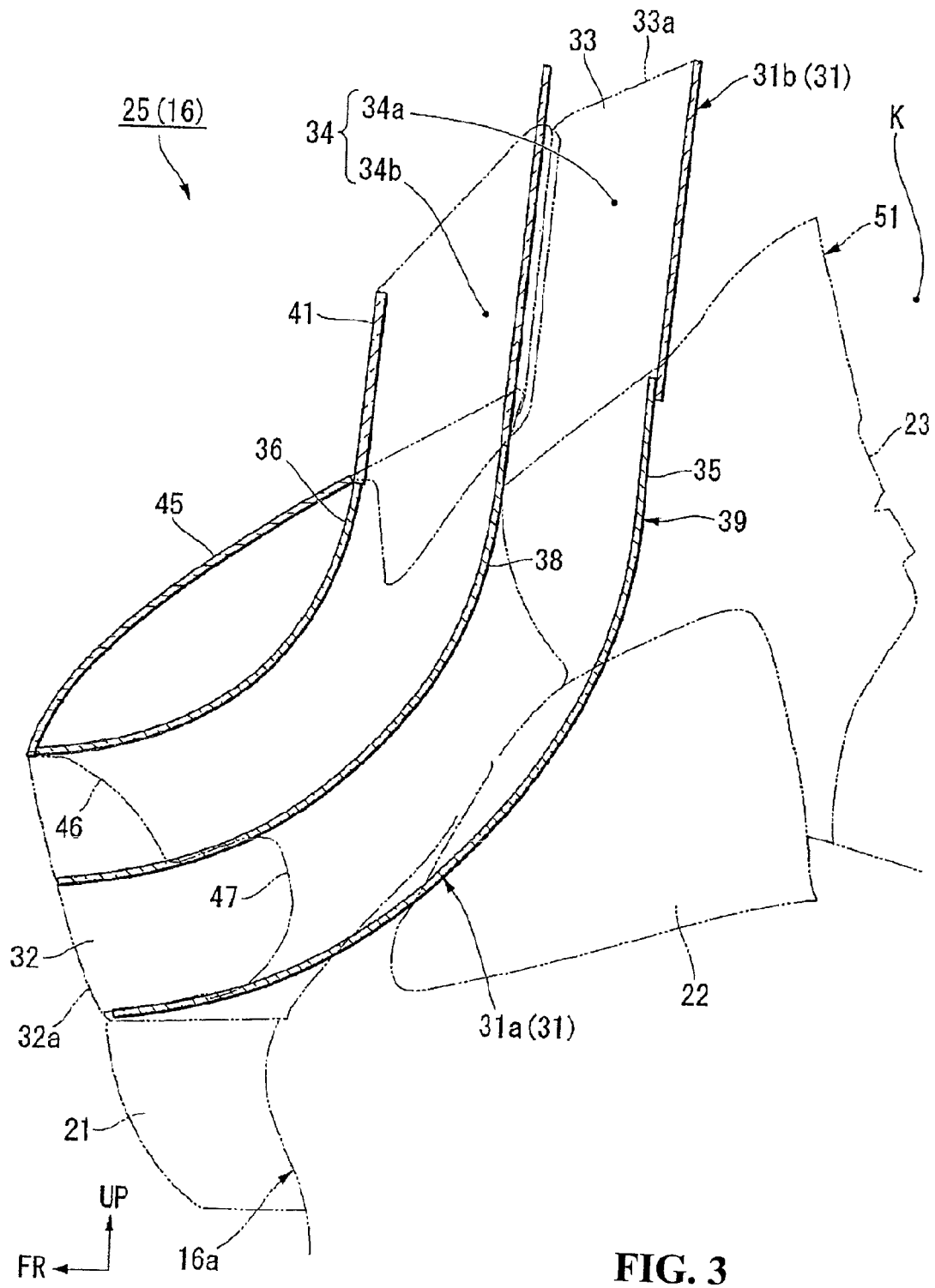
FIG. 3 is a cross-sectional view taken along line E-E of FIG. 2.

With additional reference to FIG. 3, the air duct 31 includes an air introduction port 32, an air blowout port 33 and an air passage 34. The air introduction port 32 is located at the lower front end of the screen 25 to open toward the front of the vehicle. The air blowout port 33 is located at a rear upper end of the screen 25 to open toward the upside of the vehicle. The air passage 34 extends between the air introduction port 32 and the air blowout port 33.

The air duct 31 has a predetermined thickness in the front-back direction (the interior-exterior direction) of the screen 25 (the front cover 16). The air duct 31 is provided to get into the rearward (the inside of the vehicle, inside the screen 25) from the front surface (the exterior surface) thereof. The front portion (the lower portion) of the air duct 31 is formed as a curved portion 31a curved to have a steeper slant as it goes rearward (upward) and is formed to protrude toward the inside of the vehicle, or is curved to be concaved as viewed from the outside of the vehicle (the outside of the screen 25). The upper portion of the air duct 31 is formed as a linearly extending straight portion 31b having a relatively steep slant.

Figure 5:
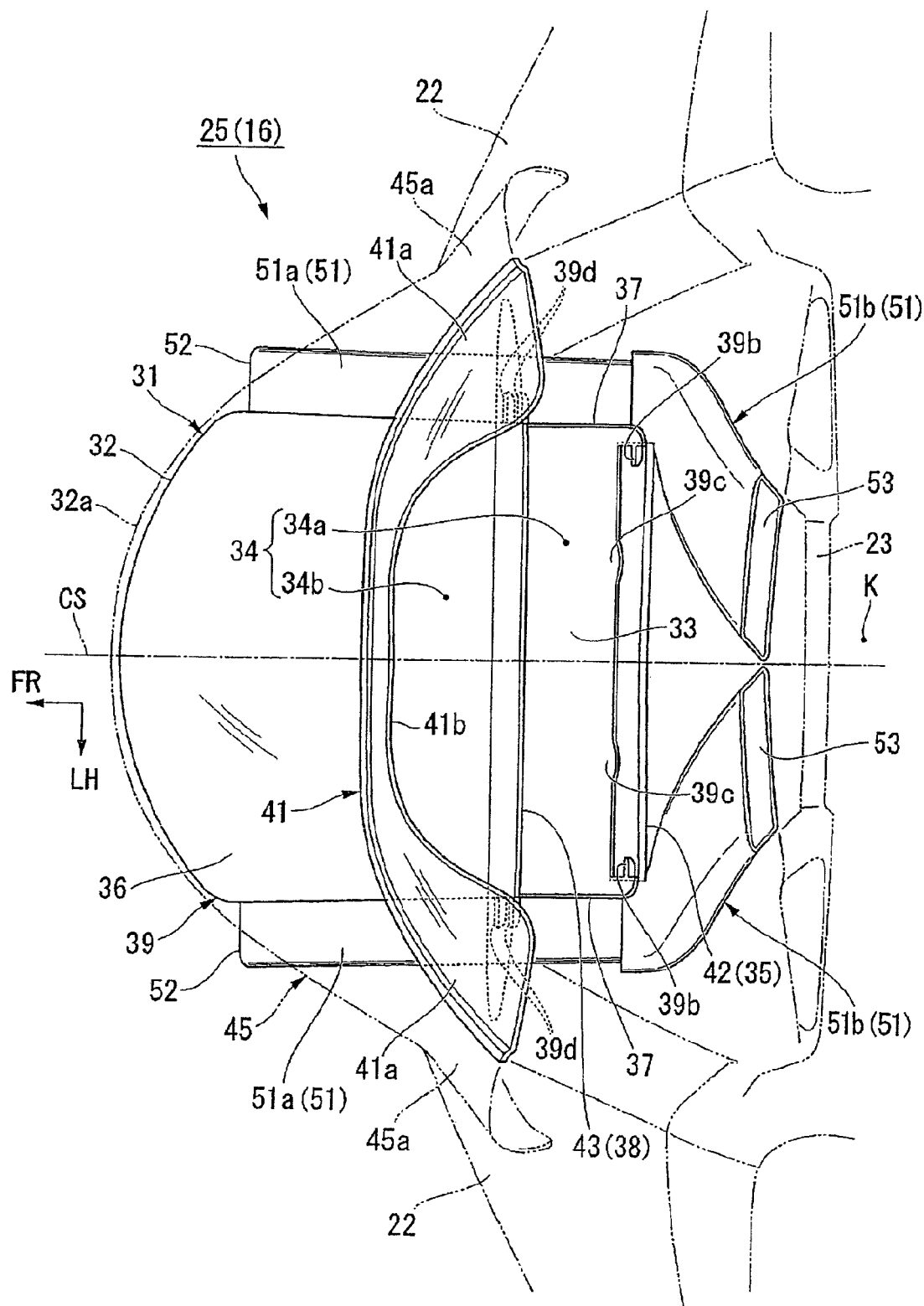
FIG. 5 is a plan view of the front cover.

Referring to FIG. 5, the air introduction port 32 and the air blowout port 33 are each shaped to have a transverse elongate opening with a predetermined left-right width on the left-right inside of the vehicle body. The air introduction port 32 and the air blowout port 33 have almost the same opening shape. The air passage 34 having almost the same sectional shape as their opening shapes extends uniformly in cross-section along the curved portion 31a and along the straight portion 31b. The screen 25 (the front cover 16) including the air duct 31 is provided symmetrically with respect to the left-right center plane CS of the vehicle body.

The air duct 31 has a hollow, transversely elongate cross-sectional shape to form the air passage 34. A front (vehicle-inside) wall portion and a rear (vehicle-outside) wall portion of the air duct 31 are called the inner wall 35 and the outer wall 36, respectively. In addition, wall portions on the left and right sides are called left and right lateral walls 37.

The inner and outer walls 35, 36 are each formed like a plate extending substantially in the left-right direction and extending along the curved portion 31a and along the straight portion 31b. The left and right lateral walls 37 are formed like plates generally perpendicular to the left-right direction and extend along the curved portion 31a and along the straight portion 31b as with the inner and outer walls 35, 36.

The outer wall 36 has left and right lateral portions formed circularly in cross-section and merging respectively with the left and right lateral walls 37. The left and right inside portions of the outer wall 36 are provided so as to be separate from the respective vehicle outer lateral edge portions of the left and right lateral walls 37 further toward the front side (the outside of the vehicle). A partition wall 38 is provided between the vehicle external lateral edges of the left and right lateral wall portions 37 so as to separate the air passage 34 into an inner passage 34a and an outer passage 34b. The partition wall 38 is formed like a plate substantially extending in the left-right direction and extending along the curbed portion 31a and along the straight portion 31b. The inner and outer passages 34a, 34b have almost the same thickness in the internal-external direction of the screen 25. The partition wall 38 functions as a guide plate for air flow flowing in the whole of the air passage 34. In addition, the air duct 31 may be configured to form a single air passage 34 without the partition wall 38.

The air introduction port 32 opens along a screen front end surface 32a that slants to be located more forwardly as it goes upward as viewed from the side and that curves to be forwardly (externally of the vehicle) convex. The lower edge of the air introduction port 32 is located in the vicinity of the lower end of the air duct 31, and thus of the screen 25. The headlight 21 having an external surface (a front surface) generally continuous with the screen front end surface 32a is disposed below the air introduction port 32.

The air blowout port 33 opens along the screen upper end surface 33a extending rearwardly and upwardly. The screen upper end surface 33a is provided so that its rear side portion more gently slants than its front side portion as viewed from the side. The rear edge of the air blowout port 33 is located in the vicinity of the rear end of the air duct 31, and thus of the screen 25. The air duct 31 including the air introduction port 32 and the air blowout port 33 is provided to reduce the left-right width compared with that of the entire screen 25.

The air duct 31 is dividedly composed of a duct body 39 forming the curved portion 31a and the left and right lateral walls 37 of the straight portion 31b, an upper cowl 41 forming the outer wall 36 of the straight portion 31b, inner and outer flat portions 42, 43 forming the inner wall 35 and partition wall portion 38, respectively, in the straight portion 31b. The upper cowl 41 is located above the lower cowl 45. These form the screen 25 and thus the outer surface of the front portion of the motorcycle 1.

The upper cowl 41 is provided such that its left and right lateral portions 41a leftward and rightward externally protrude from the left and right lateral wall portions 37, respectively. In addition, the upper cowl 41 slants more as viewed from the front so as to be located on the left-right inside as it goes upward. Further, the upper cowl 41 is provided to be curved as viewed from the front so that the slant is made gentler (is made convex toward the outside of the vehicle) as it goes upward.

The upper ends of the left and right lateral portions 41a of the upper cowl 41 are located near the upper end of the air duct 31 (the screen 25). An upper notch portion 41b, formed like an inverted trapezoid as viewed from the front, is provided at the upper portion of the upper cowl 41 so as to lower the near-central upper edge height of the upper cowl 41. This allows the occupant J to obtain a view through the screen 25, more specifically, only though the inner and outer flat portions 42, 43.

That is to say, a clear view can be ensured through the screen 25 by making only the inner and outer flat portions 42, 43 transparent and colorless, and smooth. In addition, the inner and outer flat portions 42, 43 and the upper cowl 41 may be formed integrally with the duct body 39. Alternatively, a portion or a front portion of the screen 25 excluding the inner and outer flat portions 42, 43 may be made of the same nontransparent resin as the cover body 16a.

With reference to FIGS. 2 and 6, downward extending lower extensions 41c are respectively provided on both lateral lower portions of the upper cowl 41. Leftward and rightward externally extending coupling flanges 39a are respectively provided on both lateral upper portions of the outer wall 36 of the duct body 39. The lower extensions 41 and the coupling flanges 39a are coupled together with screws, clips or the like to integrally attach the upper cowl 41 to the duct body 39.

Referring to FIGS. 3 and 5, the inner flat portion 42 is formed like a flat plate in a generally rectangle shape slightly elongate to the left and the right as viewed from the front. The left and right lateral portions of the inner flat portion 42 overlap from the rearward left and right inner coupling portions 39b, respectively, formed at the rear edges (vehicle-inner edges) of the left and right lateral walls 37 in the straight portion 31b. These are integrally coupled together with screws, clips or the like. Both lower portions of the inner flat portions 42 overlap from the rear, the left and the right lower coupling portions 39c formed at the upper edge of the inner wall 35 in the duct body 39. These are integrally coupled together with screws, clips or the like.

The outer flat portion 43 is formed like a flat plate and has left and right lateral portions that protrude to the left and the right outwardly to respectively overlap the left and right lateral portions 41a of the upper cowl 41. In addition, the outer flat portion 43 has an upper edge portion formed like an upward convex semicircle as viewed from the front. The left and right lateral portions of the outer flat portion 43 overlap from the front left and right outer coupling portions 39d formed at respective front edge portions (vehicle-external lateral edge portions) of the left and right lateral walls 37 in the straight portion 31b. These are integrally coupled together with screws, clips or the like. The lower edge portion of the outer flat portion 43 is contiguous with the upper end of the partition wall of the duct body 39 so as to be abutted thereagainst. The upper edge portion of the outer flat portion 43 is provided such that its left and right side portions protrude upward from the screen upper end surface 33a.

With reference to FIG. 6, the lower cowl 45 is formed as a piece separate from the air duct 31. For example, the upper portion of the lower cowl 45 is connected to brackets 45b provided on the outer wall 36 of the duct body 39 with screw, clips or the like. The lower portion of the lower cowl 45 is appropriately supported by the periphery of the air introduction port 32. Thus, the lower cowl 45 is integrally attached to the air duct 31. In addition, the outer wall 36 in the curved portion 31a may be eliminated and instead the lower cowl 45 may be formed as part of the air duct 31.

Referring to FIGS. 2, 3 and 5, the lower cowl 45 is provided so as to relatively gently slant rearwardly and upwardly as viewed from the side and to bend to make a slant gentler (to protrude vehicle-outwardly) as it goes rearward (upward). In addition, the lower cowl 45 is provided to bend to extend more rearward (to protrude vehicle-outwardly (forwardly)) as it goes to the left and the right outwardly in whole as viewed from above. Left and right protrusions 45a are provided on the left and right sides of the lower cowl 45 so as to protrude to the left and the right outwardly from the left and right lateral portions 41a of the upper cowl 41 (to generally protrude along the entire left-right width of the front cover 16).

The left and right protrusions 45a are provided to slant as viewed from the front to be located more to the left and the right inwardly as they go upward and to bend as viewed from the front to make its slant gentler (to protrude vehicle-outwardly) as they go upwardly. The proximal portions of the left and right back mirrors 22 are respectively located below the left and right protrusions 45a. Left and right air introduction ports 22a and 45c are provided at the proximal portions of the left and right rearview mirrors 22 and at the left and right protrusions 45a, respectively, to enable rearward supply of partial air flow.

The lower cowl 45 has left and right lower ends located at the lower end of the screen 25. The lower cowl 45 is provided at a lower portion with a lower opening 46 adapted to cause the air introduction port 32 of the air duct 31 and the like to face the front of the vehicle. The lower opening 46 is formed to have the same opening shape as that of the air introduction port 32. Further, the lower opening 46 is formed on left and right sides with left and right notches 46a facing the front ends of the left and right second air ducts 51, respectively.

The lower cowl 45 covers the outer wall 36 and thus the entire curved portion 31a from the vehicle-external side with a predetermined interval defined between the outer wall 36 of the curved portion 31a of the air duct 31 and the lower cowl 45. In other words, the curved portion 31a and the outer wall 36 thereof both concavely bending as viewed from the vehicle body side are covered from the vehicle-external side by the lower cowl 45 convex as viewed from the vehicle-external side. In this way, even if the air duct 31 has the concavely curved portion 31a to guide air flow from the front of the vehicle toward the upside, the curved portion 31a is not largely exposed to the screen 25 and thus to the external appearance of the front portion of the motorcycle 1. Thus, it is easy to form a protrusion or linear streamline type external appearance on the vehicle-outside, which enhances the flexibility of designing the screen 25 and thus the external appearance of the motorcycle 1.

With the screen 25 as described above, during operation of the motorcycle 1, the air flow flowing from the front toward the rear is allowed to flow obliquely upwardly and rearwardly, and to the left and the right outwardly along the respective external surfaces of the upper and lower cowls 41, 45. In addition, a portion of the air flow is introduced into the air duct 31 from the air introduction port 32 (see arrow A in FIG. 1). The air flow is blown out from the air blowout port 33, having such directional characteristics as to face the oblique upward and rearward, while changing its flowing direction to the upside along the air duct 31 (see arrow B in FIG. 1).

The air flow blown out from the air blowout port 33 functions to change also the flow of air flow passing above the screen 25 and reaching the occupant J, in the oblique upward and rearward direction (see arrow C in FIG. 1). Thus, the windshield unit can lead the entire air flow about to reach the occupant J so as to avoid the occupant J (i.e., providing a satisfactory windshield effect) while suppressing the height of the screen 25 (the height of the front cover 16).

The enhanced windshield effect reduces air flow pressure against the occupant J and wind noise during operation of the motorcycle 1. However, negative pressure (pressure lower than ambient atmospheric pressure) is likely to occur in the open space K (the space surrounding the occupant I) rearward (inward) of the front cover 16 and tends to increase backpressure applied to the occupant J.

Figure 4:
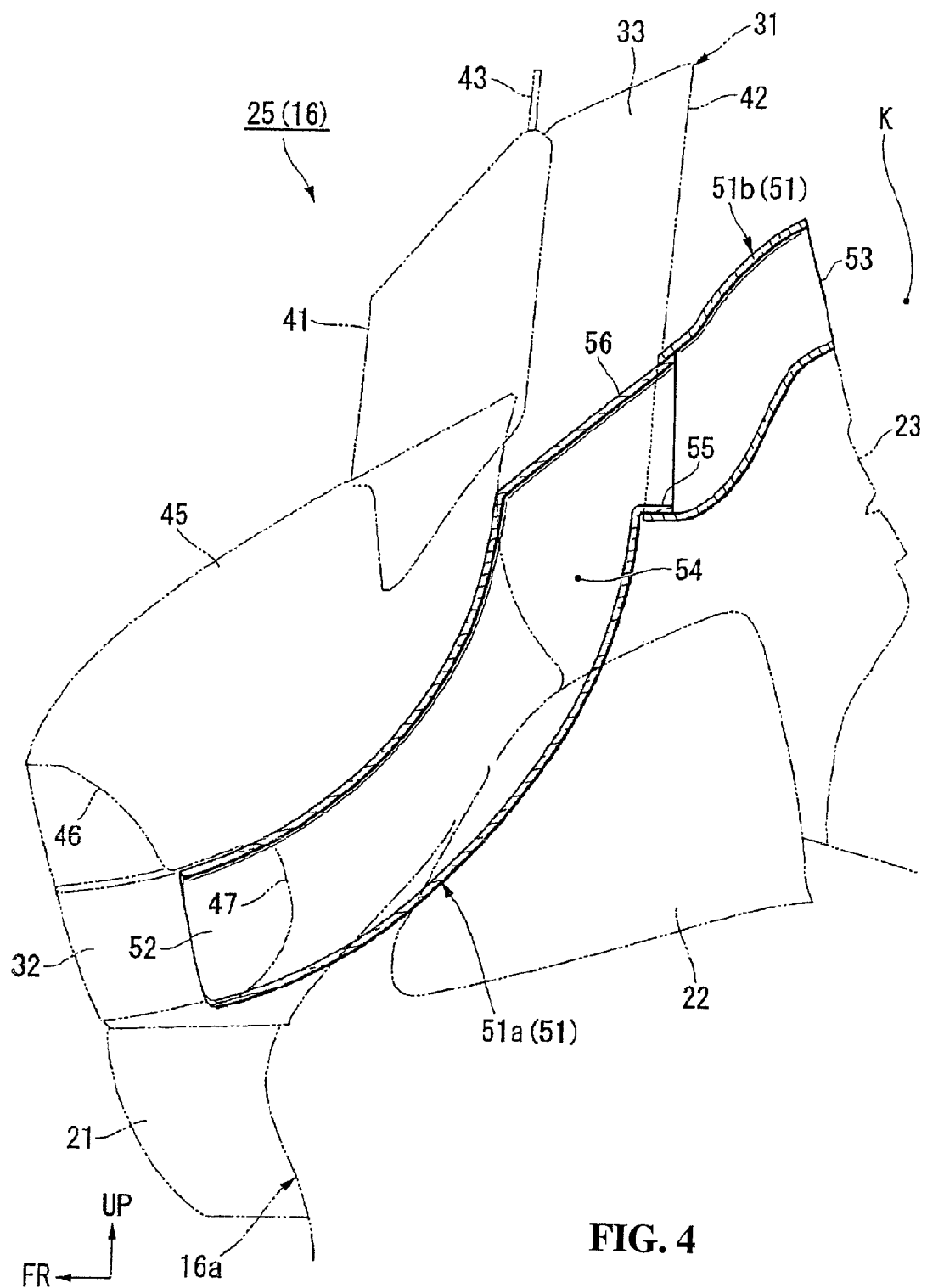
FIG. 4 is a cross-sectional view taken along line F-F of FIG. 2.

To eliminate such a tendency, as shown in FIGS. 2 and 4 and others, the screen 25 is allowed to enable a supply of pressure-regulating air to the open space K described earlier by using the left and right second air ducts 51 (see arrow D in FIG. 1). The left and right second air ducts 51 includes left and right second air introduction ports 52, left and right second air blowout ports 53 and left and right second air passages 54. The left and right second air introduction ports 52 are located on both left and right sides of the air introduction port 32 to open toward the front of the vehicle. The left and right second air blowout ports 53 are located to the rear of the straight portion 31b of the air duct 31 to open toward the rear (on the side of the open space K). The left second air passage 54 extends between the left second air introduction port and the left second air blowout port 53 and the right second air passage 54 extends between the right air introduction port and the right second air blowout port 53.

As shown in FIGS. 2, 4, 5 and 6, the left and right second air ducts 51 have respective portions that are close to the second air introduction ports 52, and are adjacent to and extend along left and right external sides of the left and right laterals 37, respectively, of the curved portion 31a of the air duct 31 to form second curved portions 51a. The second air introduction ports 52 are adjacent to the left and right external sides, respectively, of the air introduction port 32 and open in a longitudinally elongate, generally rectangular shape as viewed from the front. The peripheral portions of the second air introduction ports 52 protrude vehicle-outwardly (forwardly) from the screen front end surface 32a. The second curved portions 51a each have almost the same sectional shape as the opening shape of the second air introduction port 52 and extend along the air duct 31 so as to have a generally uniform cross-section. An upper end of the second curved portion 51a (an end close to the second air blowout port 53) has a rearward upwardly extending upper wall portion 55a so as to open rearward in a generally rectangular shape.

Respective portions, of the left and right second air ducts 51, close to the second air blowout ports 53 are formed as guide portions 51b that extend from upper end rear opening 55 of the second curved portion 51a obliquely upward and rearward, as viewed from the side, and obliquely rearward, and leftward and rightward inward, as viewed from above. The guide portion 51b is formed as a piece separate from the second curved portion 51a. The front end of the guide portion 51b (the end close to the second curved portion 51a) is fitted to the outer circumference of the upper end rear opening 55 of the second curved portion 51a, whereby the second curved portion 51a and the guide portion 51b are integrally coupled together.

The guide portions 51b each extend obliquely upwardly and rearward from the upper end rear opening 55 of the second curved portion 51a while increasing its left-right width and form at its rear end a second air blowout port 53 formed in a transversely long, general square with a large left-right width. The guide portion 51b has a front end side cross-sectional area (corresponding to an upper end rear side opening area of the second curved portion 51a) generally equal to the opening area of the second air introduction port 52. The guide portion 51b is formed to broaden toward the end so that this cross-sectional area is more increased as it goes toward the rear end side (on the side of the second air blowout port 53). The second air blowout port 53 opens obliquely upward and rearward along a slant plane as viewed from the side so as to be located more forwardly as it goes upward.

Figure 7:
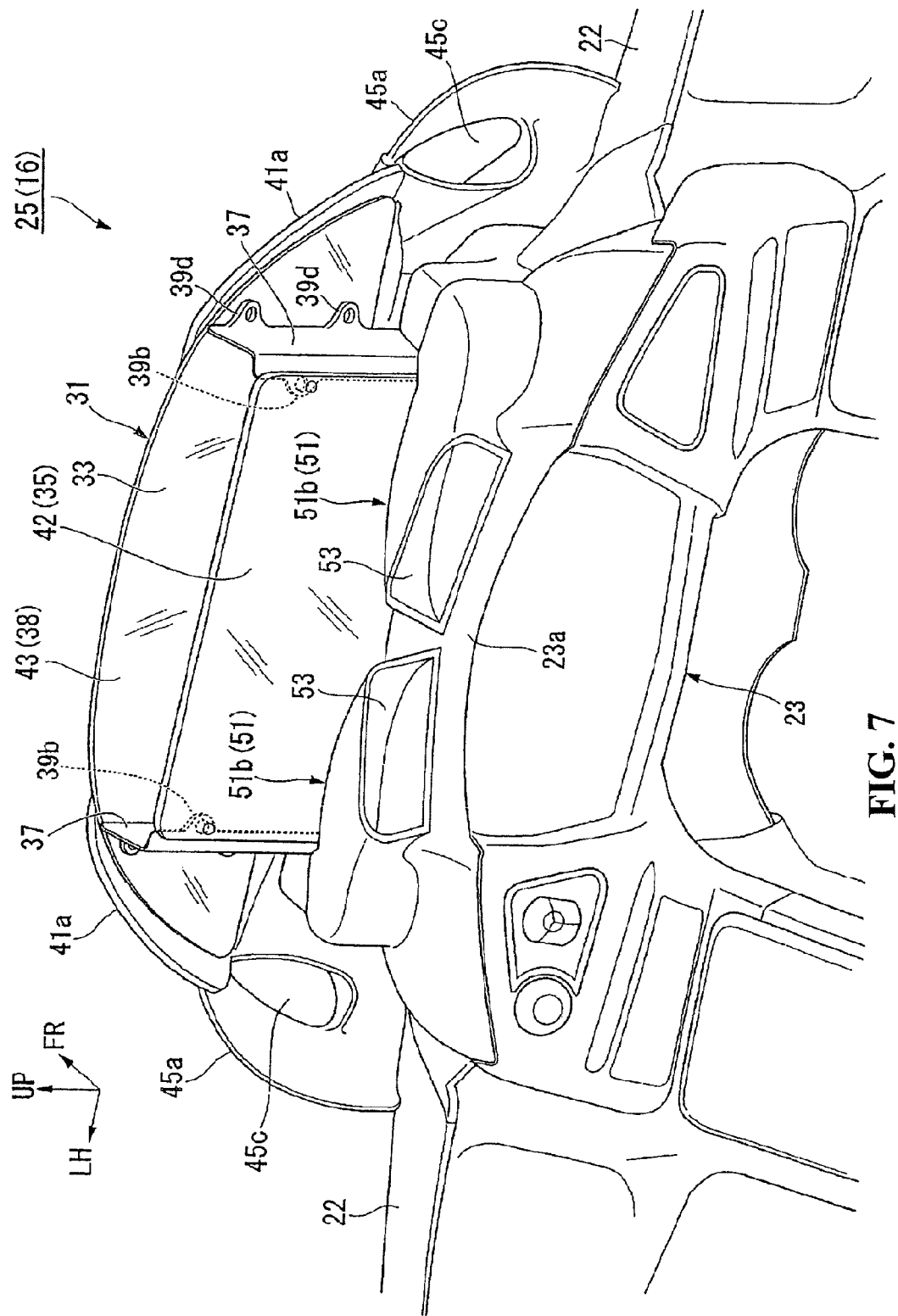
FIG. 7 is a perspective view as viewed from the rearward of the front cover.

Referring to FIG. 7, an instrument panel 23 is provided inside the front cover 16. Indicating portions for various data such as the vehicle speed, travel distance, etc. of the motorcycle 1, an indication selector switch for the indication portions and the like are appropriately arranged on the instrument panel 23. The instrument panel 23 is provided to transversely extend along the entire left-right width of the front cover 16. A meter cover 23a is provided above the instrument panel 23 so as to cover it from above. The left and right guide portions 51b and the left and right second air blowout ports 53 are arranged on the meter cover 23a so as to be integral therewith.

The left and right second air blowout ports 53 are located at respective positions close to the vicinity of the rear edge of the meter cover 23a and rearward separate by a predetermined amount from the straight portion 31b of the air duct 31 so as to bring their left and right inside ends close to each other at a position near the left-right center plane CS of the vehicle body. The left and right external ends of the left and right second air blowout ports 53 are arranged to be located on the left and right insides of the left and right outside ends of the air blowout port 33 and thus of the air duct 31. In short, the left and right second air blowout ports 53 are arranged on the left and right insides of the air blowout port 33 (the air duct 31).

With the left and right second air ducts 51 described above, a negative pressure state rearward of the front cover 16 can be alleviated during operation of the motorcycle 1 to reduce back pressure. Since the second air blowout ports 53 are disposed above, on the periphery of the meter cover 23a (the instrument panel 23), they will approach the open space K forward of the occupant J, whereby the negative pressure state rearward of the front cover 16 more tends to be alleviated.

In particular, the left and right second air blowout ports 53 are disposed close to the vehicle body left-right center (on the left-right inside of the front cover 16). Therefore, the air flow led by the left and right second air ducts 51 is directly supplied to close to the vehicle body left-right center where the negative pressure in the open space K is likely to occur. In addition, such air flow becomes hard to be caught in the air flow flowing on the left-right outsides of the front cover 16. This can effectively and equally suppress the occurrence of the negative pressure in the open space K.

A portion (the guide portion 51b) of the second air duct 51 close to the second air blowout port 53 functions as a diffuser by increasing the sectional area as it goes toward the second air blowout port 53. Thus, the diffuser suppresses the flow rate of the air flow taken in from the second air introduction port 52 and blows the air flow into the open space K while appropriately diffusing it.

As described above, the windshield unit (the front cover 16) of the motorcycle 1 according to the present embodiment includes the air duct 31 adapted to allow the air introduction port 32 opening toward the front of the vehicle to communicate with the air blowout port 33 opening toward the upside of the vehicle; and the second air duct 51 adapted to allow the second air introduction port 52 opening toward the front of the vehicle to communicate with the second air blowout port 53 disposed rearward of the air duct 31 to open toward the rearward of the vehicle. The second air blowout port 53 is disposed within the left-right width of the air blowout port 33 of the air duct 31.

With this configuration, since the air flow from the front of the vehicle can be led upward through the air duct 31, the height of the windshield can be suppressed and further the windshield effect can be enhanced, as compared with a general windshield unit not having the air duct 31.

The second air duct 51 is provided to regulate the pressure inside the front cover 16 and the air flow led through the second air duct 51 is blown out from the second air blowout port 53 located on the left-right inside (close to the left-right center of the vehicle body) of the front cover 16. This enhances the windshield effect to effectively reduce the negative pressure inside the front cover 16 that is otherwise likely to occur particularly close to the left-right center of the vehicle body. Thus, the pressure difference rearward of the front cover 16 can be corrected uniformly and effectively.

The windshield unit is equipped with the instrument panel 23 provided rearward of the air duct 31 to indicate vehicle speed and with the meter cover 23a covering the instrument panel 23. In addition, the second air blowout port 53 is disposed on the periphery of (above) the meter cover 23a. Thus, the second air blowout port 53 will be disposed at a position close to the open space K forward of the occupant, which can more effectively reduce the negative pressure state rearward of the front cover 16.

The windshield unit includes a pair of the left and right second air ducts 51. The second air introduction ports 52 of the left and right second air ducts 51 are respectively disposed adjacently to the left and right outsides of the first air introduction ports 32. The left and right second air ducts 51 are disposed close to the second air blowout ports 53 so as to be displaced on the left-right inside of the air duct 31. Thus, an increase in the vertical thickness of the front cover 16 on the periphery of the air introduction ports 32, 52 is suppressed and the second air ducts 51 can be disposed close to the periphery of the air duct 31.

The windshield unit is such that the opening area of the second air blowout port 53 is set to a value greater than that of the second air introduction port 52. Thus, the air flow taken in from the second air introduction ports 52 can be blown out from the second air blowout ports 53 while being appropriately diffused. The air flow directly striking the occupant J rearward of the front cover 16 is reduced and further the pressure difference rearward of the front cover 16 can be corrected.

Figure 8:
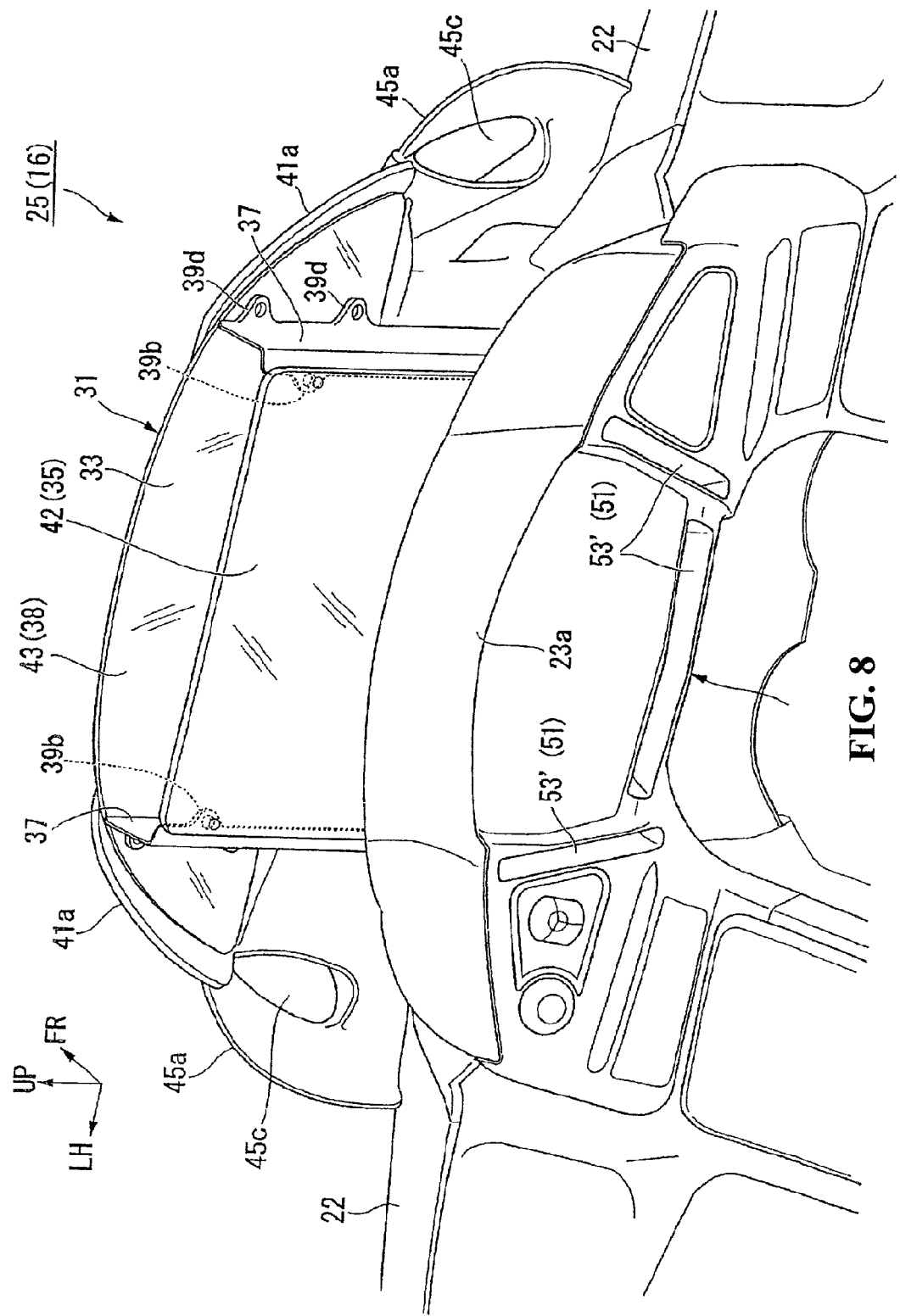
FIG. 8 is a perspective view illustrating a modification of the embodiment, corresponding to FIG. 7.

In addition, the present invention is not limited to the embodiment described above. For example, as shown in FIG. 8, second air blowout ports 53' of the second air ducts 51 may be arranged inside the instrument panel 23, i.e., on the periphery of the meter cover 23a.

The second air blowout ports 53, 53' may be provided with openable-closable and flow-adjustable louvers or the like. Alternatively, the second air ducts 51 may be provided with openable-closable and flow-adjustable openings at any places. This makes it possible to control the blowout amount, blowout direction, etc. of air flow toward the open space K.

The second air ducts 51 including the second air introduction ports 52 and the second air blowout ports 53, 53' may not be the matched pair but may be a single, or three or more. Further, the second air ducts 51 may be provided on the not left and right of, but above and below, the air duct 31.

The configuration of the above embodiment is one example of the present invention and, needless to say, may be applicable to motorcycles, three- or four-wheeled saddle-ride type vehicles in addition to scooter type vehicles. Various modifications may obviously be enabled in the range not departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield unit for a saddle-ride type vehicle, comprising:
 a first air duct adapted to allow a first air introduction port opening toward the front of the vehicle to communicate with a first air blowout port opening toward the upside of the vehicle; and
 a second air duct adapted to allow a second air introduction port opening toward the front of the vehicle to communicate with a second air blowout port disposed rearwardly of the air duct to open toward the rear side of the vehicle;

wherein an instrument panel is disposed rearwardly of the first air duct to indicate vehicle speed; and a meter cover is provided for covering the instrument panel;

wherein the second air blowout port is disposed on the periphery of the meter cover within a left-right width of the first air blowout port;

wherein an opening area of the second air blowout port is set to a value greater than that of the second air introduction port and wherein the second air blow out port is formed in a transversely, long, generally square shape with a large, left-right width.

2. The windshield for the saddle-ride type vehicle according to claim 1, wherein the second air blowout port is disposed above the meter cover.

3. The windshield for a saddle-ride type vehicle according to claim 1, wherein a pair of the left and right second air ducts are provided, the respective second air introduction ports of the left and right second air ducts are respectively provided adjacently to the left and right outsides of the first air introduction ports, and the left and right second air ducts are each provided close to the second air blowout port to be displaced on the left-right inside of the first air duct.

4. The windshield for a saddle-ride type vehicle according to claim 2, wherein a pair of the left and right second air ducts are provided, the respective second air introduction ports of the left and right second air ducts are respectively provided adjacently to the left and right outsides of the first air introduction ports, and the left and right second air ducts are each provided close to the second air blowout port to be displaced on the left-right inside of the first air duct.

5. A windshield unit adapted for use with a saddle-ride type vehicle, comprising:

a first air duct for directing a flow of air from a first air introduction port opening toward the front of the vehicle to a first air blowout port opening toward the upside of the vehicle; and a second air duct for directing a flow of air from a second air introduction port opening toward the front of the vehicle to a second air blowout port disposed rearwardly of the air duct to open toward the rear side of the vehicle;

wherein an instrument panel is disposed rearwardly of the first air duct to indicate vehicle speed; and a meter cover is provided for covering the instrument panel;

said second air blowout port being disposed on the periphery of the meter cover within a left-right width of the first air blowout port, wherein an opening area of the second air blowout port is set to a value greater than that of the second air introduction port; and wherein the second air blowout port is formed in a transversely, long, generally square shape with a larger, left-right width.

6. The windshield adapted for use with the saddle-ride type vehicle according to claim 5, wherein the second air blowout port is disposed above the meter cover.

7. The windshield adapted for use with a saddle-ride type vehicle according to claim 5, wherein a pair of the left and right second air ducts are provided, the respective second air introduction ports of the left and right second air ducts are respectively provided adjacently to the left and right outsides of the first air introduction ports, and the left and right second air ducts are each provided close to the second air blowout port to be displaced on the left-right inside of the first air duct.

8. The windshield adapted for use with a saddle-ride type vehicle according to claim 6, wherein a pair of the left and right second air ducts are provided, the respective second air introduction ports of the left and right second air ducts are respectively provided adjacently to the left and right outsides of the first air introduction ports, and the left and right second air ducts are each provided close to the second air blowout port to be displaced on the left-right inside of the first air duct.

* * * * *